US010218063B2

(12) United States Patent
Pang et al.

(10) Patent No.: US 10,218,063 B2
(45) Date of Patent: *Feb. 26, 2019

(54) RADIO SIGNAL PICKUP FROM AN ELECTRICALLY CONDUCTIVE SUBSTRATE UTILIZING PASSIVE SLITS

(71) Applicant: AliphCom, San Francisco, CA (US)

(72) Inventors: Hawk Yin Pang, San Jose, CA (US); Rajiv Agarwal, Menlo Park, CA (US); Thomas Alan Donaldson, Nailsworth (GB)

( * ) Notice: Subject to any disclaimer, the term of this patent is extended or adjusted under 35 U.S.C. 154(b) by 84 days.

This patent is subject to a terminal disclaimer.

(21) Appl. No.: 13/952,532

(22) Filed: Jul. 26, 2013

(65) Prior Publication Data

US 2015/0031287 A1 Jan. 29, 2015

(51) Int. Cl.

*H04B 5/00* (2006.01)
*H01Q 13/10* (2006.01)
*H01Q 1/38* (2006.01)
*H01Q 5/385* (2015.01)

(52) U.S. Cl.

CPC ............... *H01Q 1/38* (2013.01); *H01Q 5/385* (2015.01); *H01Q 13/10* (2013.01)

(58) Field of Classification Search

CPC ........... H01Q 1/38; H01Q 5/385; H01Q 13/10
USPC ................................ 343/770; 455/41.1, 41.2
See application file for complete search history.

(56) References Cited

U.S. PATENT DOCUMENTS 8,872,723 B2 * 10/2014 Lee .......................... H04B 1/03 343/872
2007/0225034 A1 * 9/2007 Schmidt ................. H01Q 1/241 455/552.1
2013/0035050 A1 * 2/2013 Gao ....................... H01Q 1/243 455/193.1
2014/0018023 A1 * 1/2014 Lee .......................... H04B 1/03 455/128
2015/0029067 A1 * 1/2015 Pang ...................... H01Q 13/10 343/770

* cited by examiner

*Primary Examiner* — Ayodeji Ayotunde

(57) ABSTRACT

Embodiments of the present application relate generally to electronic hardware, computer software, wireless communications, network communications, wearable, hand held, and portable computing devices for facilitating communication of information and presentation of media. An electrically conductive substrate, such as a sheet of metal or metal alloy, for example, includes an active antenna formed by a slot or opening formed in the substrate, and also includes at least one separate passive slot or opening (e.g., a passive slit) formed in the substrate. The active antenna may be intentionally detuned from one or more target frequencies (e.g., 802.11, 2.4 GHz, 5 GHz) such that the active antenna is not optimized (e.g., is not tuned) for the one or more target frequencies. One portion of the active antenna may be electrically coupled with a ground potential. Another portion of the active antenna may be electrically coupled with a RF receiver, transmitter, or transceiver.

14 Claims, 15 Drawing Sheets

RADIO SIGNAL PICKUP FROM AN ELECTRICALLY CONDUCTIVE SUBSTRATE UTILIZING PASSIVE SLITS

CROSS-REFERENCE TO RELATED APPLICATIONS

This application is related to the following applications: U.S. patent application Ser. No. 13/957,337, filed on Aug. 1, 2013, and titled "RF Architecture Utilizing A MIMO Chipset For Near Field Proximity Sensing And Communication"; U.S. patent application Ser. No. 13/919,307, filed on Jun. 17, 2013, and titled "Determining Proximity For Devices Interacting With Media Devices"; and U.S. patent application Ser. No. 13/802,646, filed on Mar. 13, 2013, and titled "Proximity-Based Control Of Media Devices For Media Presentations"; all of which are hereby incorporated by reference in their entirety for all purposes.

FIELD

These present application relates generally to the field of personal electronics, portable electronics, media presentation devices, audio systems, and more specifically to wirelessly enabled devices that may detect and may wirelessly communicate with one another while disposed in near field RF proximity of one another, including in direct contact with one another.

BACKGROUND

Conventional wireless communication standards, such as those for Bluetooth and WiFi systems (e.g., 802.11xx, 2.4 GHz or 5 GHz bands, etc.) allow for a receiver to measure signal strength from an external RF transmitting source, such as smartphone or other wireless device, for example. One measure of signal strength is received signal strength indication (RSSI). RSSI may be regarded as an indication of RF power being received by an antenna of the receiving wireless device. High RSSI values are indicative of a strong signal and low RSSI values are indicative of a weak signal. In that the RSSI is a relative measure of received signal strength, the units of measure for RSSI may be in arbitrary units. For example, in one application RSSI may be assigned arbitrary units of 0 to 100 or 0 to some maximum value of RSSI. Therefore, units of actual measured power, such as mW or dBm need not be used and may not be helpful in determining relative strength or weakness of received signal strength in a wireless environment.

In some applications it is desirable to use RSSI to estimate distance between the transmitting device and the receiving device. For example, if the transmitting device and receiving device are approximately 10 cm away from each other, then the RSSI should be stronger than when they are 1 meter away from each other. However, there are known difficulties in using RSSI readings for accurate distance measurements due to many factors including but not limited to: (a) multipath effects caused by RF signal reflection off surrounding objects such as walls, moving objects, and stationary objects; (b) differences in antenna radiation patterns and polarization patterns of the transmitting and receiving antennas; and (c) RF interference generated by other radiators of RF energy in the wireless environment of the receiver that is attempting to measure the RSSI of a specific transmitter; just to name a few. Generally, close distance RSSI measurements may be made with a higher accuracy than long distance measurements due to the inverse square power drop off of the RF signal (i.e., $1/R^2$) in the far field region and a greater drop off (e.g., greater than $1/R^3$) in the near field region. Close proximity sensing using RSSI has a statistically higher level of accuracy and a receiving device may infer that it is in close proximity to a transmitting device when both devices are close to one another. However, there remains a small probability that a false alarm may be triggered when the RSSI indicates close proximity when in fact the two devices are not in close proximity to each other.

Thus, there is a need for systems that allow for accurate RF signal detection to be made in close proximity between transmitting and receiving devices without relying solely on RSSI information or that don't use RSSI information for determining proximity.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying drawing FIGS. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
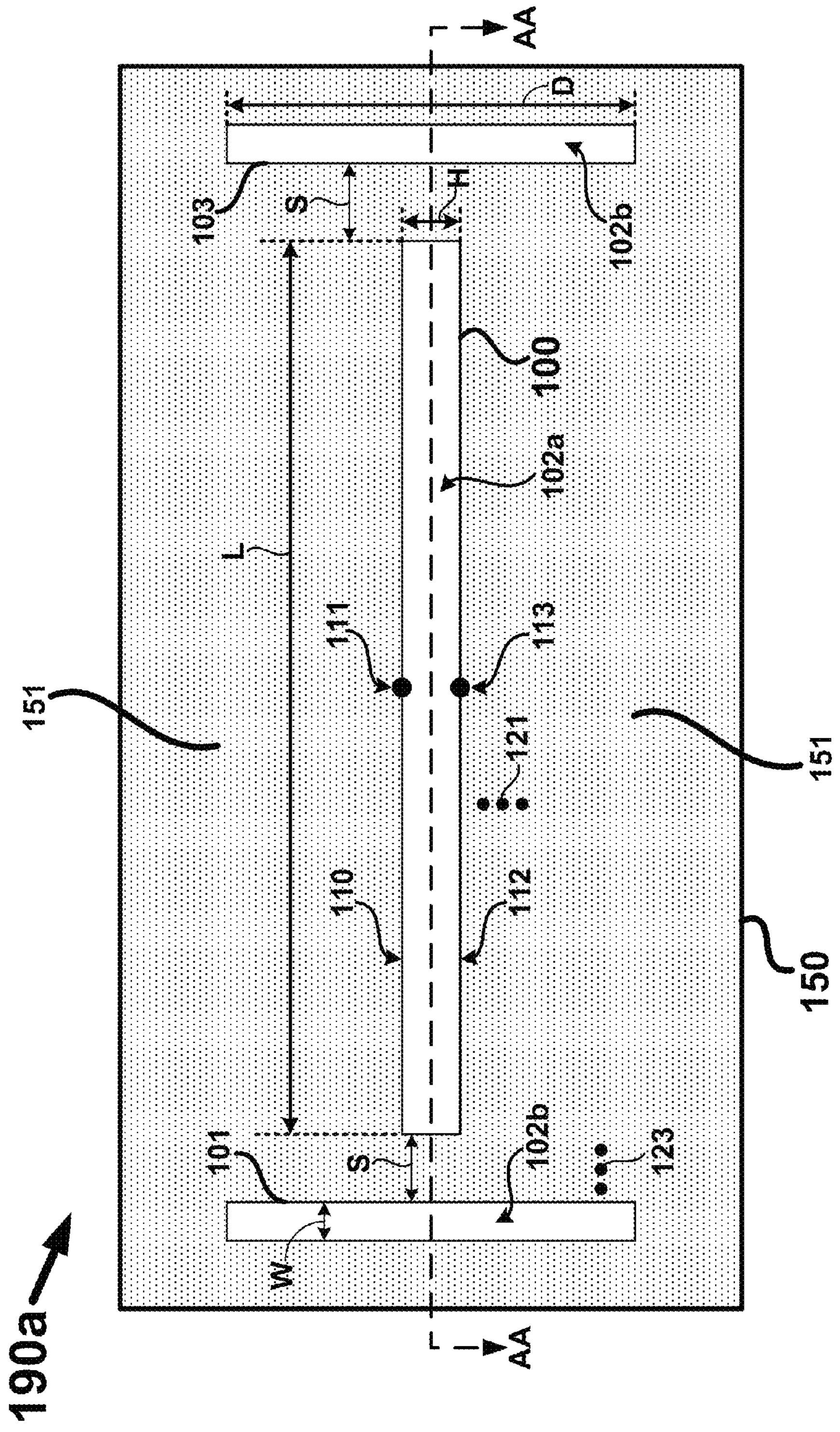
FIG. 1A depicts a top plan view of one example of an active antenna and passive slits formed in a substrate of an electrically conductive material, according to an embodiment of the present application.

FIG. 1A depicts a top plan view 190*a* of a substrate of an electrically conductive material 150 in which a plurality of separate apertures (e.g., holes or openings) are formed. Here, those separate apertures are depicted looking down on a surface 151 of the substrate 150. Therefore, the separate apertures may be described as through holes formed in the substrate 150 and extending all the way through the substrate 150 as will be described in greater detail in FIG. 1B.

One or more of the separate apertures comprises an active antenna 100 having a length dimension L that is substantially larger that a width dimension H. For example, if active antenna 100 has the shape of a rectangle as depicted in FIG. 1A, then H is much less than L (e.g., H<<L), such that if L is 150 mm then H may be 10 mm or less (e.g., H=3.5 mm). Actual shapes and dimensions of the active antenna 100 may be application dependent and are not limited to the configuration depicted in FIG. 1A or in any other figures herein. One edge 110 of antenna 100 is electrically coupled with a radio frequency (RF) system (not shown) (e.g., a RF receiver, RF transmitter or RF transceiver) and an opposite edge 112 is electrically coupled with a ground potential (not shown) (e.g., a ground—GND or chassis ground). Edges 110 and 112 are along a length dimension of the active antenna 100. As one example, a node 111 on edge 110 may be electrically coupled with the RF system and another node 113 on the opposite edge 112 may be electrically coupled with the ground potential. In some examples, the electrical connections for nodes 111 and 113 may be reversed and node 113 electrically coupled with the RF system and node 111 electrical coupled with the ground potential. Although the position of the electrical connections to the edges 110 and 112 are depicted directly opposite each other, that is node 111 is directly opposite node 113, the nodes may be positioned along their respective edges at other locations and the configuration depicted is a non-limiting example. Although one active antenna 100 is depicted there may be a plurality of active antennas as denoted by 121.

Substrate 150 also includes one or more apertures that define a passive slit denoted as 101 and 103. Although two passive slits (101, 103) are depicted there may be just a single passive slit or more than two passive slits as denoted by 123. Moreover, the relative position on the substrate 150 of the passive slit(s) and the active antenna(s) are not limited to the configurations depicted in FIG. 1A or in other figures herein and the actual size, shape, dimensions, and positions of the passive slit(s) and/or active antenna(s) may be application dependent. Passive slits (101, 103) are not electrically coupled with circuitry, the ground potential, or the RF system. Passive slits (101, 103) are passive structures formed in the substrate 150 and may operate to modify current flow along substrate 150 generated by interaction of an external RF signal with active antenna 100 as will be described below in reference to FIGS. 4A-6. Passive slits (101, 103) are not driven by circuitry nor do they generate a signal that is coupled with circuitry.

Typically, dimensions of the passive slits (101, 103) may be much less than similar dimensions of the active antenna 100. For example, if the passive slits (101, 103) are rectangular in shape as depicted in FIG. 1A, then a width dimension W of passive slits (101, 103) may be less than the width dimension H of the active antenna 100. For example, if H is 5 mm, then W may be 1.5 mm. Moreover, if the length L of the active antenna is 150 mm then length D may be 53 mm for the passive slits (101, 103). In some examples, one or more of the passive slits may have a length D that is not shorter than the length L of the active antenna 100 or D is less than L but not by a large amount, such as when D=53 mm and L=150 mm as in the example above. For example, dimensions of L and D may be: L=170 mm and D=180 mm; or L=130 mm and D=115 mm. Actual dimensions of L and D, and/or H and W will be application dependent and are not limited to the examples described herein. Passive slits (101, 103) may be placed at various positions along surface 151 of substrate 150, such as opposite ends of active antenna 100, for example. In that the plurality of apertures are spatially separate from one another, passive slits (101, 103) may be spaced apart from active antenna 100 by a distance S that may be the same or different for each passive slit (101, 103). The active antenna 100 may be tuned to the target frequency or in some examples may be detuned to a frequency range that is below (i.e., lower) that of the target frequency or a frequency range that is above (i.e., greater) that of the target frequency. Therefore, the active antenna 100 may have its dimensions (e.g., the L dimension) selected to tune or to de-tune the active antenna 100 relative to a target frequency, such as a target frequency to be detected by a RF system or RF receiver that is electrically coupled with the active antenna 100. De-tuning may be above or below the target frequency. Active antenna 100 may have a vertical polarization pattern. Computer aided design (CAD) software, tools, and the like may be used to design and simulate the RF parameters and performance of the active antenna 100 and passive slit (101, 103) for a particular design. CAD tools including but not limited to Method of Moments EM, Momentum 3D Planar EM simulator, and ANSYS Electromagnetic Simulator for RF and antennas may be used.

In that the active antenna 100 and passive slits (101, 103) are apertures formed in substrate 150, a void in the opening defined by the apertures, denoted as 102*a* for the active antenna 100 and 102*b* for the passive slits (101, 103), may be occupied by air or some other electrically non-conductive material, medium, dielectric material, or composition of matter. Examples of suitable electrically non-conductive materials includes but is not limited to rubber, plastics, foam, glass, Plexiglas, wood, stone, a gas, paper, inert organic or inorganic materials, cloth, leather, a non-conductive liquid, Teflon, PVDF, minerals, just to name a few. A material that occupies the void/opening may be selected for a functional purpose, an esthetic purpose, or both. In some applications a functional element such as a switch, button, actuator, indicator (e.g., a LED), microphone, transducer, or the like may be positioned in void/opening (102*a*, 102*b*). In other applications the material disposed in the void/opening (102*a*, 102*b*) may include a logo, a trademark, a service mark, ASCII characters, graphics, patterns, one or more esthetic features, instructions, or the like.

Figure 1B:
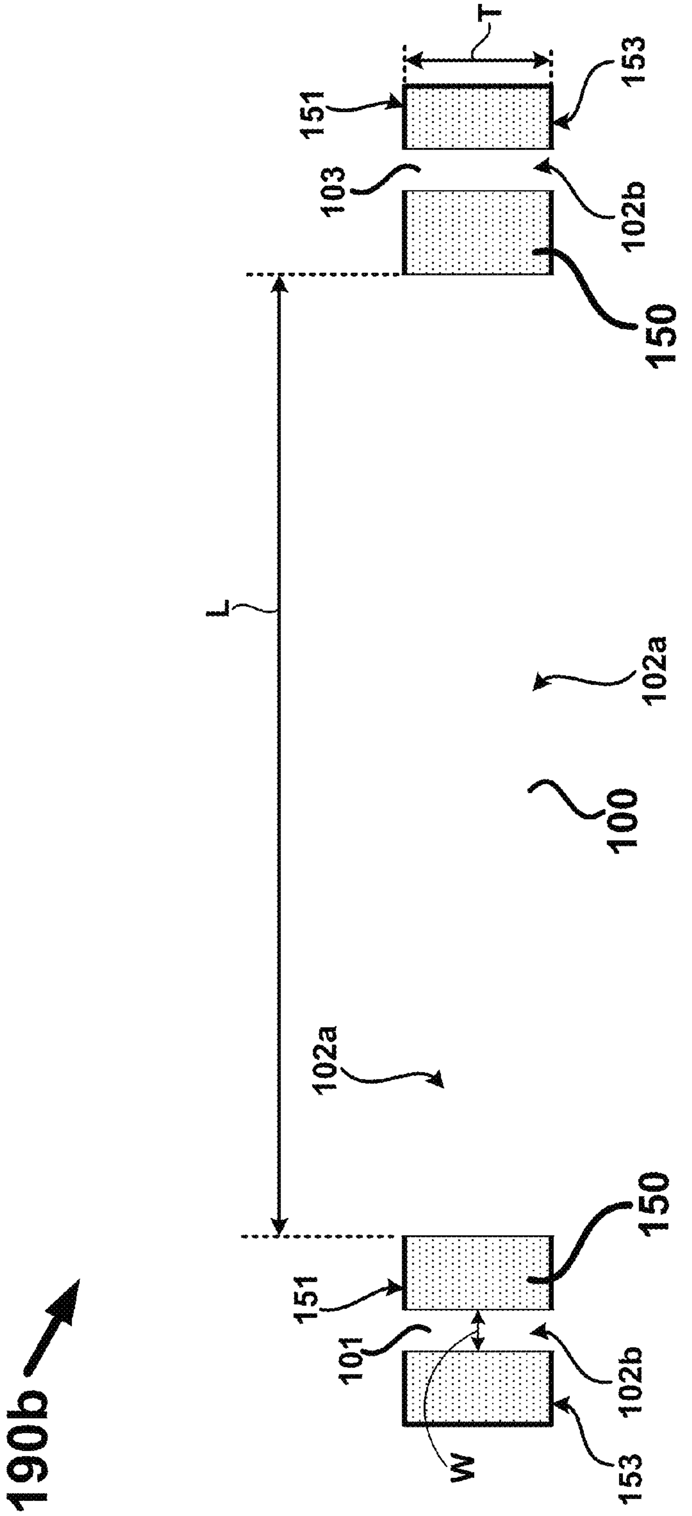
FIG. 1B depicts a cross-sectional view along line AA-AA of FIG. 1A of an active antenna and passive slits formed in a substrate of an electrically conductive material, according to an embodiment of the present application.

Moving on to FIG. 1B, a cross-sectional view 190*b* of the substrate 150 depicts in greater detail the void/opening (102*a*, 102*b*) of the apertures for active antenna 100 and passive slits (101, 103). Surfaces 151 and 153 of substrate 150 are depicted as being substantially parallel to each other; however, substrate 150 may have a thickness T that varies and need not be flat, planar, or smooth. Moreover, substrate 150 may have a shape including but not limited to an arcuate shape, curvilinear shape, an undulating shape, and a complex shape, just to name a few. Substrate 150 may be made from a perforate material (see FIG. 1E) such as a screen, mesh, or material with perforations in it.

Figure 1C:
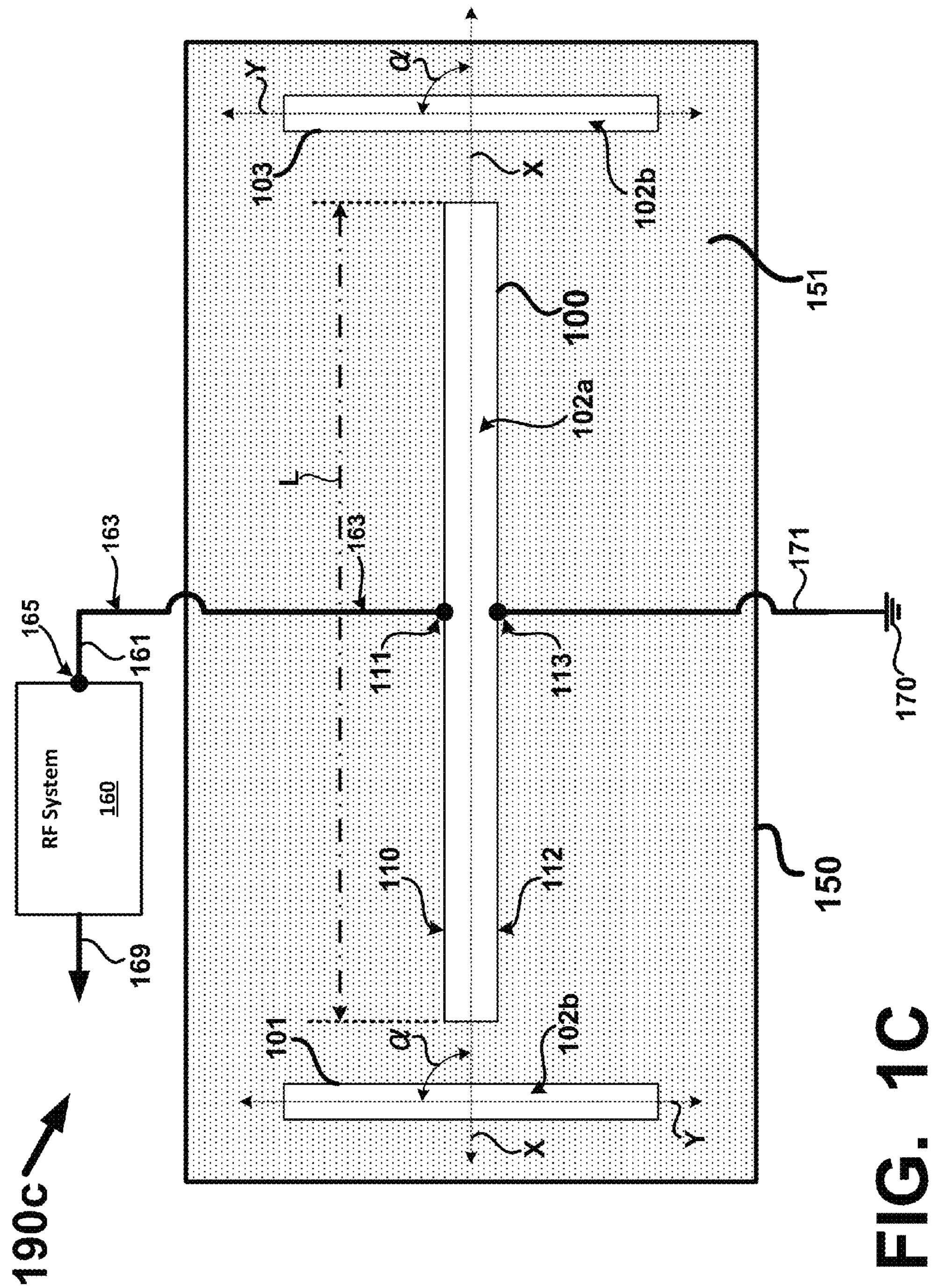
FIG. 1C depicts an example schematic diagram of electrical connections with the active antenna, according to an embodiment of the present application.

Attention is now directed to FIG. 1C where a schematic diagram 190*c* depicts one example of how the opposing sides (110, 112) along the length L dimension of the active antenna 100 may be electrically coupled. Node 111 on side 110 is electrically coupled 163 with a RF system 160. The RF system 160, active antenna 100 and its associated passive slits (e.g., 101 and 103) may also be referred to as a detection system herein. The electrical coupling 163 may be made using a variety of connection techniques including but not limited to a RF feed, coaxial cable, a wire, a shielded connection, an unshielded connection, a partially shielded connection, an electrically conductive trace, just to name a few. A node 165 of the RF system 160 may include a termination device 161, such as a SMA connector or the like, configured to make an impedance matching termination, such as 50 ohms, for example. Node 113 on side 112 is electrically coupled 171 with a ground potential 170. The ground potential 170 may include but is not limited to a chassis ground, circuit ground, and power supply ground, just to name a few. The actual selection of the appropriate ground potential may be application dependent and is not limited to the ground potentials described herein. The electrical coupling 171 may use any suitable electrical connection medium including but not limited to wire, a conductive trace, a cable, and a coaxial cable, just to name a few. RF system 160 may include one or more RF devices including but not limited to RF transceivers for WiFi, Bluetooth, Ad Hoc WiFi, RF transceivers, RF receivers, and RF transmitters. RF system 160 may include a RF device configured for and/or devoted to operation with active antenna 100 (e.g., a RF receiver). RF system 160 may generate one or more signals on an output 169 in response to RF signals received by active antenna 100.

In FIG. 1C, an axis X of the active antenna 100 is depicted as being orthogonal to an axis Y of the passive slits (101, 103). However, the configuration depicted is just one non-limiting example and the axis of the active antenna 100 and passive slits (101, 103), if any, need not have a particular angular orientation. For example, angle α as measured between the X and Y axes need not be 90 degrees (e.g., a right angle) and other angular relationships may be used. Furthermore, any angular relationship between axes of the active antenna 100 and the passive slits (101, 103) may vary such that a for 103 may be different than a for 101.

Figure 1D:
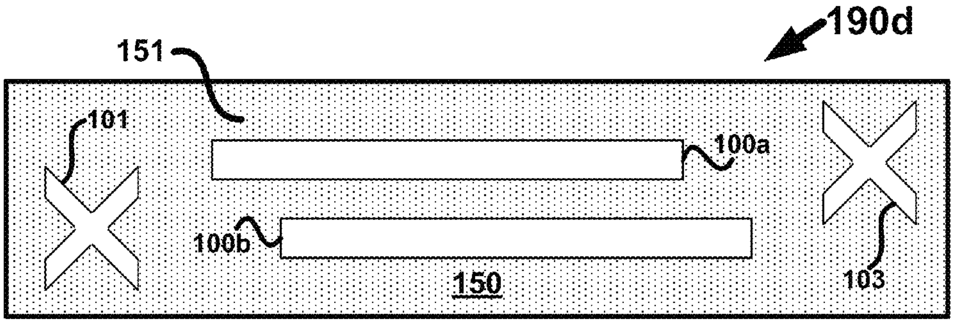
FIGS. 1D-1G are top plan views depicting examples of configurations for an active antenna and passive slits formed in a substrate of an electrically conductive material, according to an embodiment of the present application.
Figure 1E:
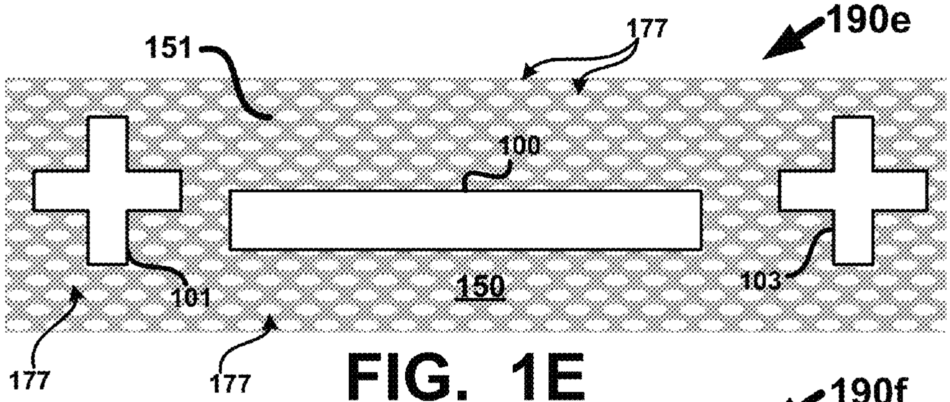

FIGS. 1D-1G depict top plan views of examples 190*d*-190*g* for different configurations for an active antenna 100 and passive slits (101, 103) formed in a substrate 150 and different configurations for the substrate 150. The examples depicted are non-exhaustive and non-limiting examples of different configurations that may be used. Moreover, the examples may include more or fewer active antennas and passive slits than depicted in FIGS. 1D-1G. In FIG. 1D, example 190*d* depicts a substrate 150 that includes two active antennas (100*a*, 100*b*) having a rectangular shape and two passive slits 101 and 103 having a "X" shape. Moreover, there is no particular symmetrical relationship between the active antennas (100*a*, 100*b*) and passive slits (101, 103). In FIG. 1E, example 190*e* depicts a substrate 150 comprised of a perforate article having a plurality of perforations 170 (e.g., through holes) distributed across its surface 151. Perforations 170 are substantially smaller than the plurality of separate apertures for the active antenna 100 and cross-shaped "+" passive slits (101, 103). FIGS. 1H-1M depict other non-limiting examples of substrates 150*h*-150*m* comprised of perforate materials having perforations similar to perforations 170.

Figure 1F:
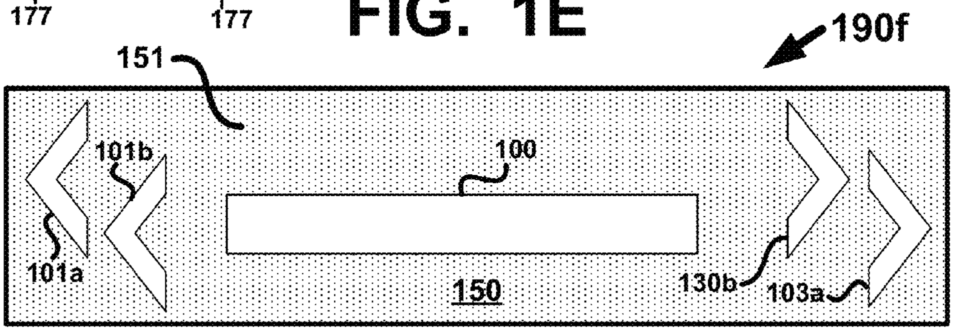
Figure 1G:
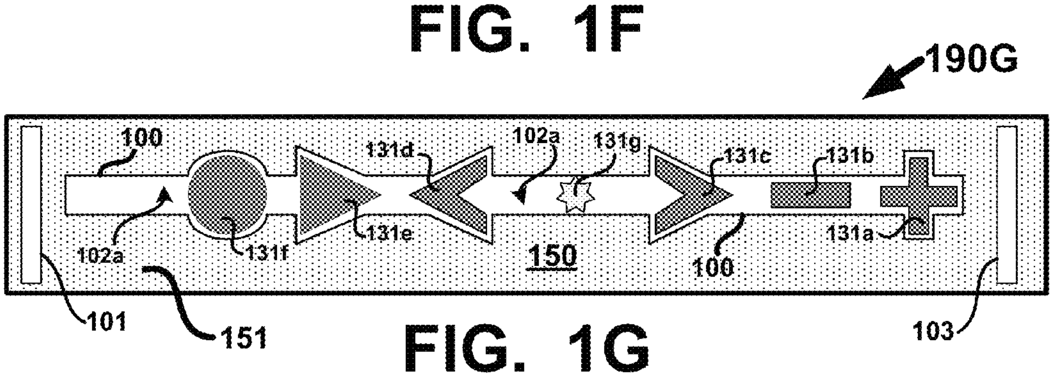
Figure 1H:
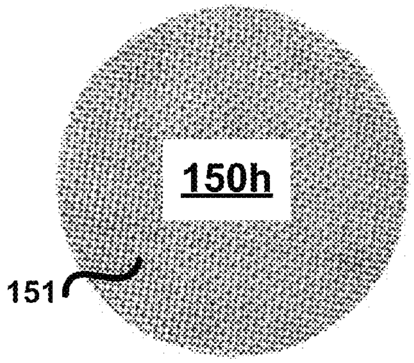
FIGS. 1H-1M depict examples of different perforate materials for a substrate of an electrically conductive material, according to an embodiment of the present application.
Figure 1I:
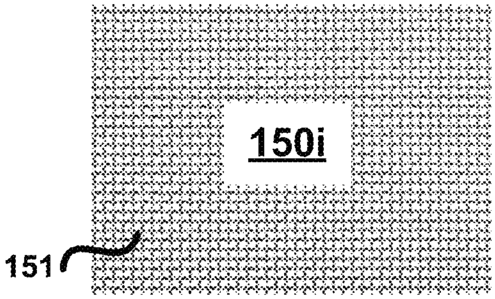
Figure 1J:
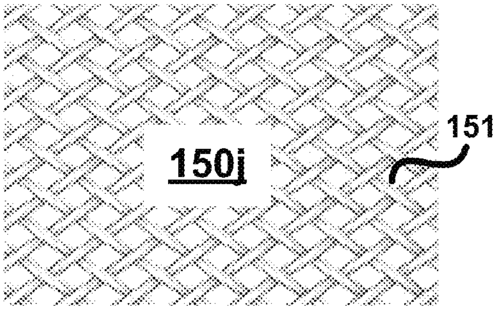
Figure 1K:
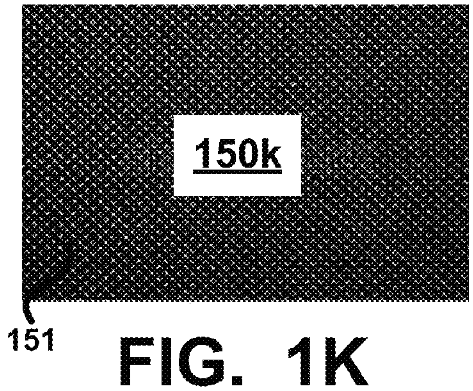
Figure 1L:
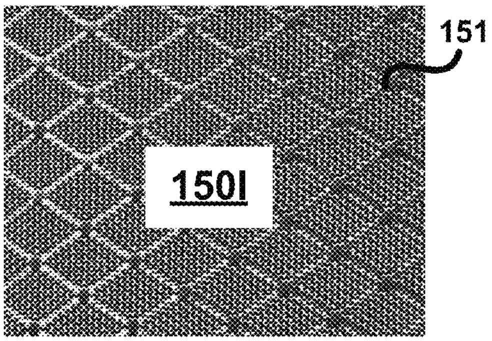
Figure 1M:
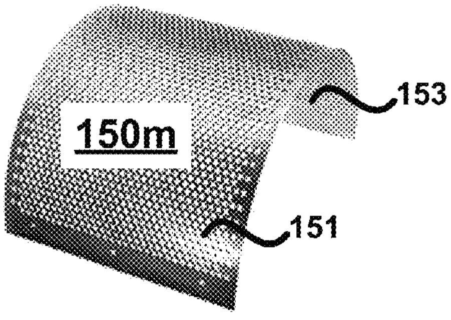

FIG. 1F depicts an example 190*f* in which there is one active antenna 100 having a rectangular shape and a plurality of passive slits (101*a*, 101*b*, 103*a*, 103*b*) having a chevron shape. In FIG. 1G, example 190*g* depicts a substrate 150 having two rectangular shaped passive slits (101, 103) and an active antenna 100 having a complex shape configured to match a contour of one or more elements 131*a*-131*f* that are positioned in the aperture 102*a* (e.g., void/opening) of active antenna 100. As one example, elements 131*a*-131*f* may be switches electrically coupled with circuitry of a device or system (not shown) that includes the substrate 150. Elements 131*a*-131*f* may be made from an electrically non-conductive material such as rubber, plastic, or a dielectric material, for example. Aperture 102*a* may be filled with the material used for the elements 131*a*-131*f* or may be a combination of air and the material used for the elements 131*a*-131*f*, for example. Examples of functional roles for elements 131*a*-131*f* include but are not limited to: 131*a* "+" for volume up; 131*b* "−" for volume down; 131*c* to go forward one track in a playback of content; 131*d* to go back one track in a playback of content; 131*e* to commence playback of content; and 131*f* to stop or halt playback of content. One or more of the elements 131*a*-131*f* may serve multiple functions, such as element 131*f* functioning to stop or halt playback of content when pressed by a user's fingers and also functioning to pair a system that includes the substrate 150 with another wireless device, such as Bluetooth paring of devices, for example. Aperture 102*a* may include other elements such as element 131*g* that may be operative as an indicator light (e.g., LED) to indicate status such as "power on", "paring mode", or "standby mode", for example. Element 131*g* may be a microphone or other type of transducer, for example.

Figure 2:
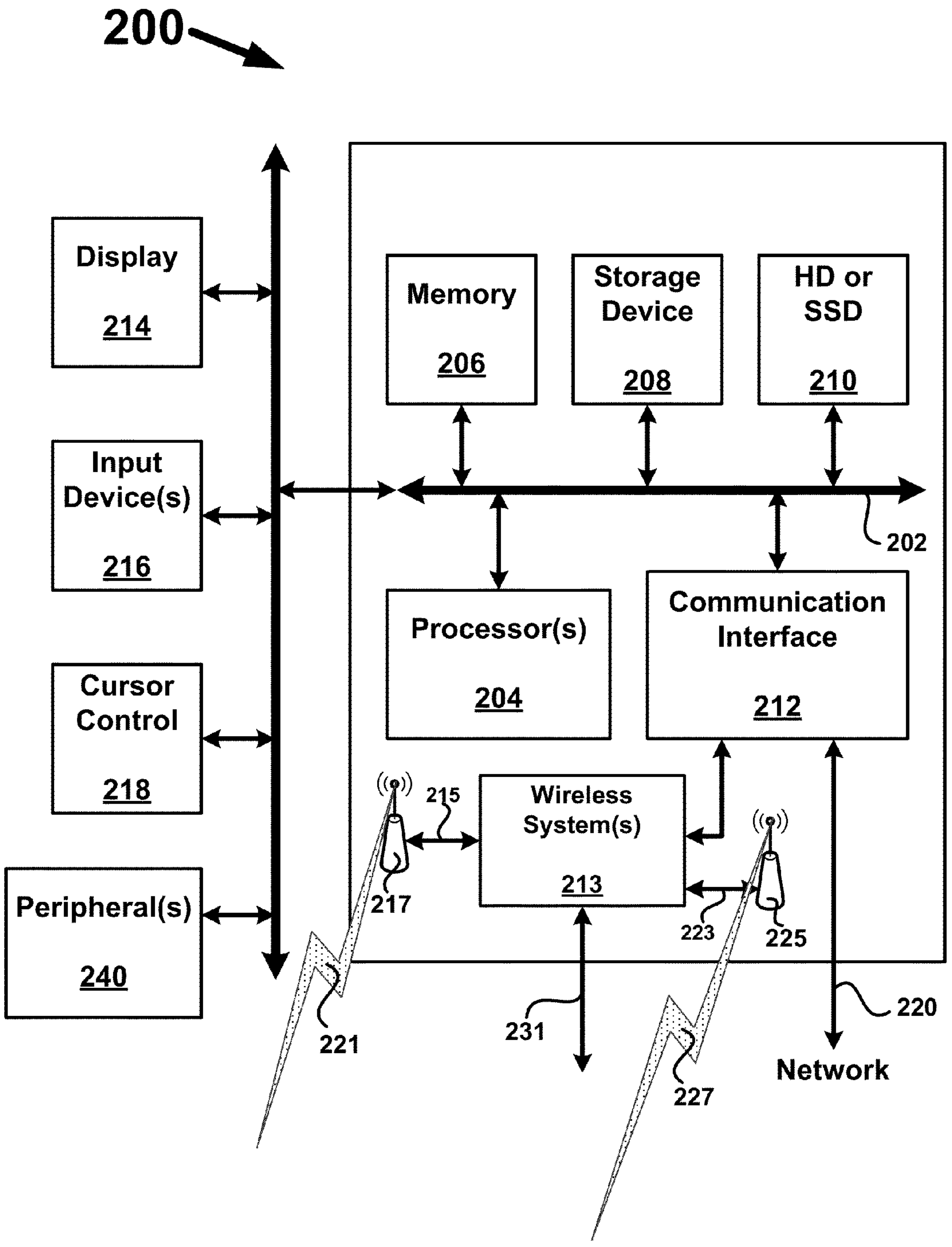
FIG. 2 depicts an exemplary computer system according to an embodiment of the present application.

FIG. 2 depicts an exemplary computer system 200 suitable for use in the systems, methods, and apparatus described herein. In some examples, computer system 200 may be used to implement circuitry, computer programs, applications (e.g., APP's), configurations (e.g., CFG's), methods, processes, or other hardware and/or software to perform the above-described techniques. Computer system 200 includes a bus 202 or other communication mechanism for communicating information, which interconnects subsystems and devices, such as one or more processors 204, system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi), display 214 (e.g., CRT, LCD, touch screen), one or more input devices 216 (e.g., keyboard, stylus, touch screen display), cursor control 218 (e.g., mouse, trackball, stylus), one or more peripherals 240. Some of the elements depicted in computer system 200 may be optional, such as elements 214-218 and 240, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HD or SSD). In some examples, circuitry may be used in place of or in combination with software instructions for implementation. The term "non-transitory computer readable medium" refers to any tangible medium that participates in providing instructions to processor 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in a drive unit 210 (e.g., a SSD or HD) or other non-volatile storage for later execution. Computer system 200 may optionally include one or more wireless systems 213 in communication with the communication interface 212 and coupled (215, 223) with one or more antennas (217, 225) for receiving and/or transmitting RF signals (221, 227), such as from a WiFi network, BT radio, or other wireless network and/or wireless devices, for example. Examples of wireless devices include but are not limited to: a data capable strap band, wristband, wristwatch, digital watch, or wireless activity monitoring and reporting device; a smartphone; cellular phone; tablet; tablet computer; pad device (e.g., an iPad); touch screen device; touch screen computer; laptop computer; personal computer; server; personal digital assistant (PDA); portable gaming device; a mobile electronic device; and a wireless media device, just to name a few. Computer system 200 in part or whole may be used to implement one or more systems, devices, or methods using the active antenna 100 and passive slits (101, 103) as described herein. For example, a radio (e.g., a RF receiver) in wireless system(s) 213 may be electrically coupled 231 with an edge 110 (e.g., at 111 or other location on the edge) of the active antenna 100. Computer system 200 in part or whole may be used to implement a remote server or other compute engine in communication with systems, devices, or method using the active antenna 100 and passive slits (101, 103) as described herein.

Figure 3A:
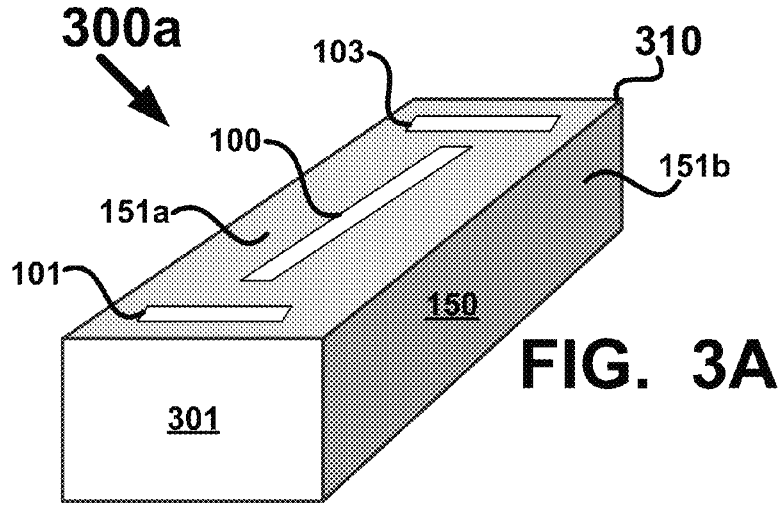
FIGS. 3A-3F depicts profile views of example configurations of an active antenna and passive slits formed in a substrate of an electrically conductive material that is positioned on a system, according to an embodiment of the present application.

Reference is now made to FIGS. 3A through 3F where profile views of example configurations of an active antenna and passive slits formed in a substrate of an electrically conductive material are depicted. In FIG. 3A, a system 300*a* includes a many sided enclosure 310 (e.g., a chassis or housing) including on at least two of its side the substrate 150 of an electrically conductive material and other sides, such as side 301 that are made from a non-electrically conductive material. The side 301 is electrically non-conductive as may be the case for other sides not visible in FIG. 3A. Here, passive slits (101, 103) and active antenna 100 are formed in surface 151*a* of one of the sides of the substrate 150. Although enclosure 310 is depicted as having a box or rectangular shape, the actual shape of enclosure 310 will be application dependent and is not limited to the shapes depicted in FIGS. 3A-3F. Enclosure 310 of system 300*a* may serve many functions, such as a wireless speaker media/content playback system that may connect with or otherwise pair with other wireless devices to negotiate content transfer to/from the other wireless devices, for example. RF system 160 in conjunction with passive slits (101, 103) and active antenna 100 may be used to detect RF signals transmitted by the other wireless devices when those devices are positioned directly on surface 151*a* or positioned in near field proximity or very close near field proximity of substrate 150 (e.g. surface 151*a*). Very close near field proximity may comprise a distance from the substrate where the passive slits (101, 103) and active antenna 100 are positioned that is approximately 0.5 meters or less. More preferably, 50 mm or less. Even more preferably, 30 mm or less. Near field proximity may comprise a distance that is greater than 0.5 meters. The foregoing are non-limiting examples of what may define near field proximity or very close near field proximity and actual values will be application dependent.

Figure 3B:
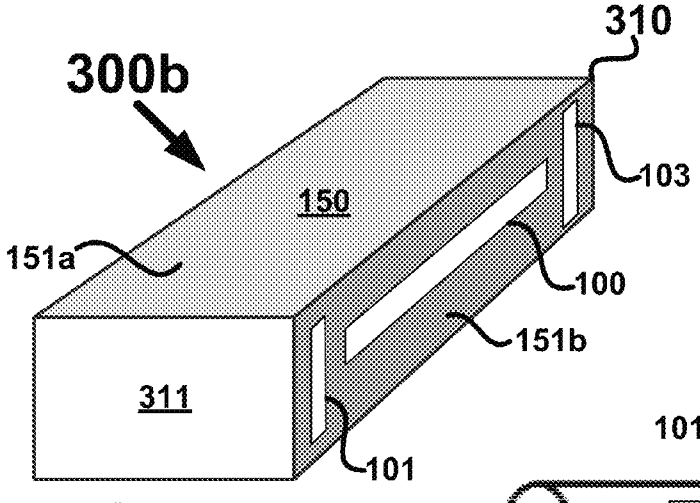

In FIG. 3B, system 300*b* includes an enclosure 310 in which the passive slits (101, 103) and active antenna 100 are positioned on a different side of the enclosure 310. A side 311 of enclosure 310 is electrically non-conductive and other sides not visible in FIG. 3B may also be electrically non-conductive. Here, surface 151*b* of substrate 150 includes the passive slits (101, 103) and active antenna 100. Therefore, the passive slits (101, 103) and active antenna

100 may be positioned on the substrate 150 in a variety of configurations that may be determined on an application specific basis.

Figure 3C:
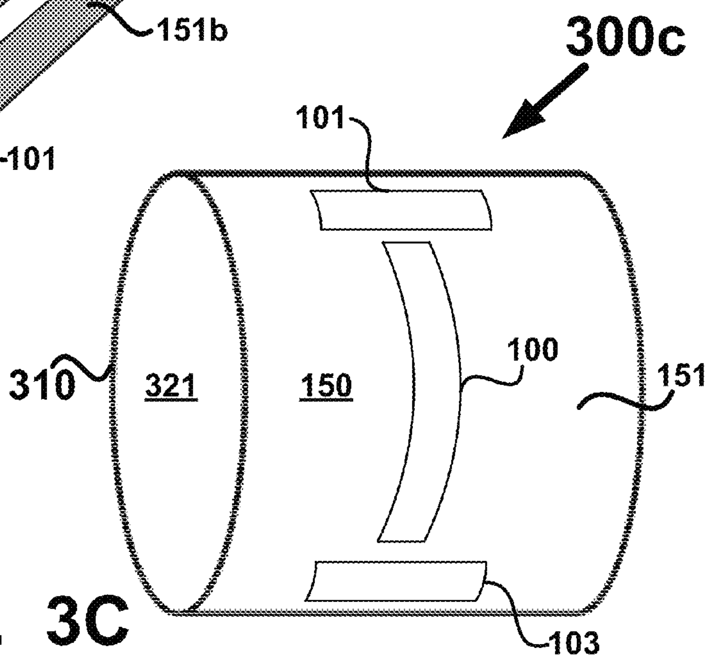

In FIG. 3C, system 300*c* includes an enclosure 310 having a cylindrical shape. A side 321 is electrically non-conductive and surface 150 includes the passive slits (101, 103) and active antenna 100. Therefore, surface 150 and its corresponding passive slits (101, 103) and active antenna 100 may have an arcuate shape or other non-linear or curvilinear shape. The side 321 is electrically non-conductive as may be the case for other sides not visible in FIG. 3C.

Figure 3D:
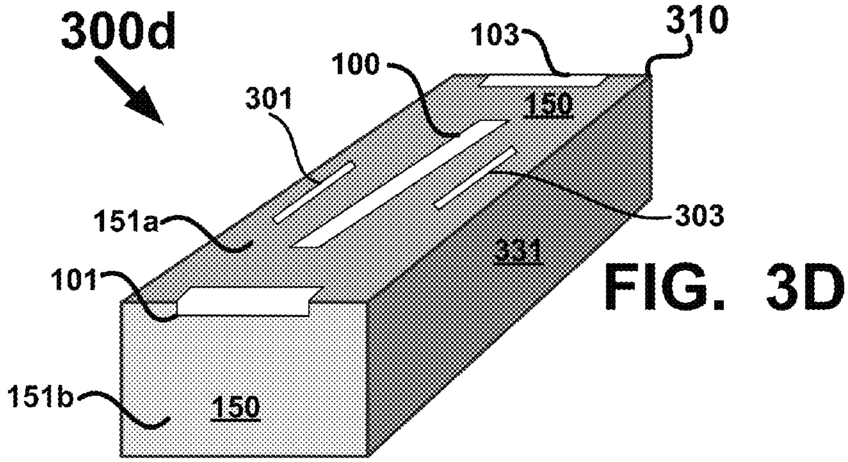

In FIG. 3D, a system 300*d* includes four (4) passive slits (101, 103, 301, 303) formed in substrate 150 which spans several sides of enclosure 310. A side 331 is electrically non-conductive as may be the case for other sides not visible in FIG. 3D. Passive slits 101 and 103 span two different sides of substrate 150 and are formed on surfaces 151*a* and 151*b*; whereas, passive slits 301 and 303 are formed only on one side of substrate 150 and are formed in surface 151*a* along with a single active antenna 100.

Figure 3E:
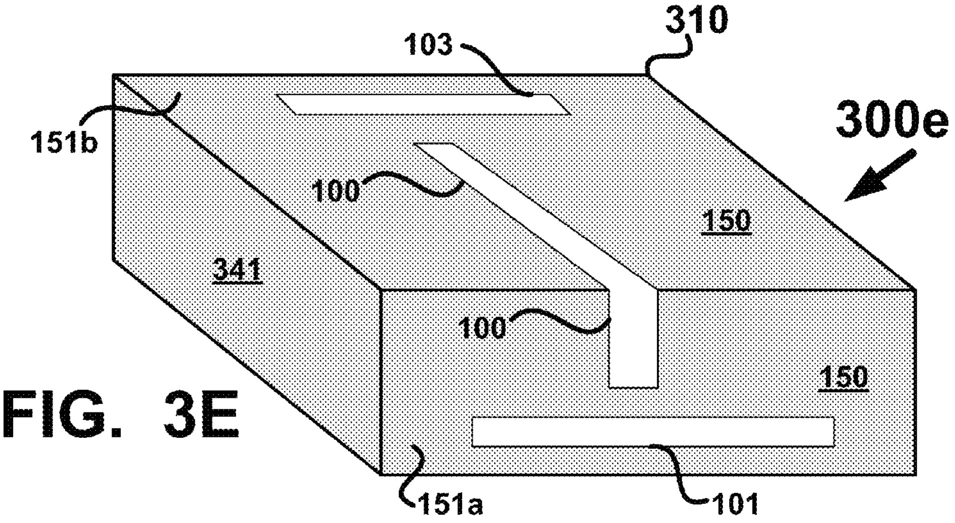

In FIG. 3E, a system 300*e* includes an enclosure 310 in which surfaces 151*a* and 151*b* have a portion of active antenna 100 formed therein. Moreover, substrate 150 includes two passive slits formed on different sides of the enclosure 310, with one of the slits 103 formed in surface 151*b* and the other slit formed in surface 151*a*. A side 341 is electrically non-conductive as may be the case for other sides not visible in FIG. 3E.

Figure 3F:
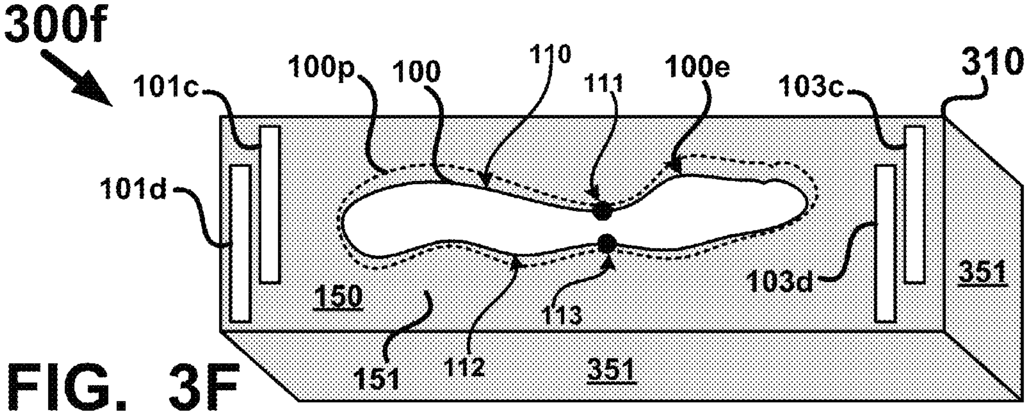

In FIG. 3F, a system 300*f* includes a substrate 150 having four passive slits (101*c*, 101*d*, 103*c*, 103*d*) and an active antenna 100 having a complex profile (e.g., along its perimeter 100*p*). Sides 351 are electrically non-conductive as may be the case for other sides not visible in FIG. 3F. Due to the complex profile of active antenna 100, the location of the opposing sides is not as straight forward as in the case where the active antenna 100 has a regular shape (e.g., a rectangle). Here, opposing sides 110 and 112 vary in distance from each other along the perimeter 100*p* (shown in dashed line). Accordingly, the points along the edges for positioning the nodes 111 and 113 may be a matter of design choice. For example, nodes 111 and 113 may be positioned at a narrow portion of the active antenna 100 were the opposing sides are closest to each other. Here, in this example where the active antenna 100 has a complex shape, a distance 100*e* around the perimeter 100*p* may be selected so that the active antenna 100 may be detuned from a target frequency by at least a wavelength of the target frequency divided by two (e.g., λ/2). In other examples, the dimensions of the active antenna 100 (e.g., the length) may be selected to tune the active antenna 100 to a target frequency. The target frequency will be application dependent and the active antenna 100 and passive slits (101, 103) may be designed to accommodate the needs of specific design goals for each application. Examples of target frequencies include but are not limited to: 2.4 GHz; 2.4 GHz-2.48 GHz; from about 2.4 GHz to about 2.48 GHz; 5 GHz; unlicensed bands, licensed bands, cellular bands, bands used by 2G, 3G, 4G, and 5G devices, Bluetooth bands, any of the 802.11 bands, military bands, just to name a few. The active antenna 100 may be tuned to the target frequency or in some examples may be detuned to a frequency range that is below that (i.e., lower) of the target frequency or a frequency range that is above (i.e., greater) that of the target frequency.

Figure 4A:
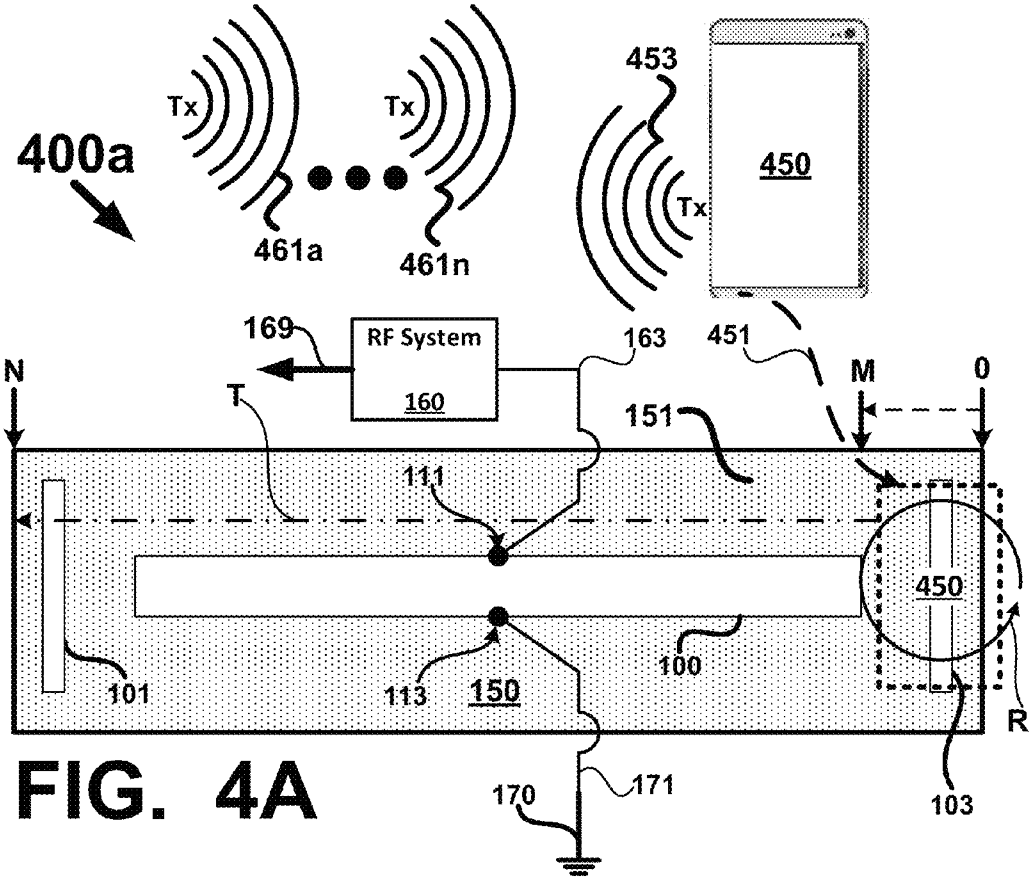
FIGS. 4A-4B depict examples of a live device generating a RF signal that may be detected by a system using an active antenna and passive slits, according to an embodiment of the present application.
Figure 4B:
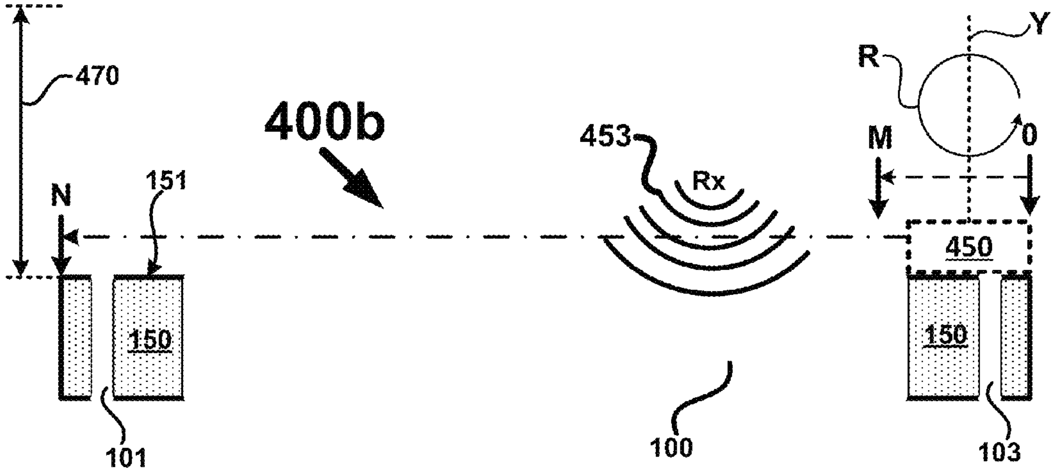

Turning now to FIGS. 4A-4B were examples of a live device generating a RF signal that may be detected by a system using an active antenna and passive slits are depicted. In FIGS. 4A-4B, nodes 111 and 113 may be connected as described in reference to FIG. 1C above. A live device 450 is transmitting Tx a RF signal 453. There may also be other RF sources in an environment in which the live device 450 and/or substrate 150 (and its associated system) reside and those RF sources are denoted as transmitting Tx sources 461*a*-461*n*. For purpose of discussion, a live device may be, without limitation, a device that is actively transmitting Tx a RF signal or may be activated (e.g., turned on, controlled or commanded) to transmit Tx a RF signal. As one example, a smartphone transmitting Tx RF using any one of its radios (BT, WiFi, 3G, 4G, 5G, 802.11, etc.) may be a live device. If the smartphone is powered off or in airplane mode, where it is not transmitting Tx RF, then the smartphone may not be a live device.

In FIGS. 4A-4B, live device 450 is placed 451 directly on surface 151 of substrate 150 at a rightmost end of the substrate 150 as denoted by point 0. The live device 450 is translated T (e.g., moved) across the surface 151 in increments of 25 mm denoted by M until it reaches the end of the substrate 150 as denoted by point N. At each increment along the path of translation T, the live device 450 is rotated R about an axis Y a full 360 degrees in increments of 45 degrees (e.g., eight increments). The RF transmission Tx 453 from live device 450 is received as RF signal Rx 453 by the active antenna 100 and stimulates the active antenna 100 to generate a signal that is detected by RF system 160. A signal generated by RF system 160 on its output 169 may be measured (e.g., using test equipment) to determine RF signal strength received by active antenna 100 from the live device 450 at different increments of angular rotation R and translation distance T along the substrate 150 (e.g., from 0 to N=250 mm). Accordingly, while the live device 450 is placed at position 0, eight measurements may be taken for angular increments of 0 deg, 45 deg, 90 deg, 135 deg, 180 deg, 225 deg, 270 deg, and 325 deg. Those measurements may be repeated for each 25 mm increment along the translation path T. The above mentioned increments are non-limiting examples and other increments may be used.

In the cross-sectional view of FIG. 4B, live device 450 is depicted in its most preferred placement, which is directly on the surface 151 of substrate 150. However, in some applications the live device 450 may be placed above the surface 151 at a distance 470 that is in very close near field proximity of the surface 151 of the substrate 150 and its associated active antenna 100 and passive slits (101, 103). Although the received RF signal Rx 453 may be at its strongest when the live device is at 470=0 (e.g., directly on surface 151), there may be circumstances where the live device is positioned in very close near field proximity of the surface 151. In the very near field region, the drop off or RF signal strength may be larger than the well understood $1/R^2$ drop off rate, and the drop off may be $1/R^3$ or $1/R^4$. Therefore, even small distances from surface 151 may result in a large drop off in RF signal strength as received by active antenna 100 and detected by RF system 160. Distance 470 is preferably 0.5 meters or less, more preferably 50 mm or less, and even more preferably 30 mm or less. Actual distances for very close near field proximity will be application dependent and are not limited to the examples described herein. The live device 450 may comprise a wide variety of wirelessly enabled devices including but not limited to a smartphone, gaming device, tablet or pad, wireless headset or earpiece, a laptop computer, an image capture device, a wireless wristwatch or timepiece, a data capable strapband or wristband, just to name a few.

Figure 5:
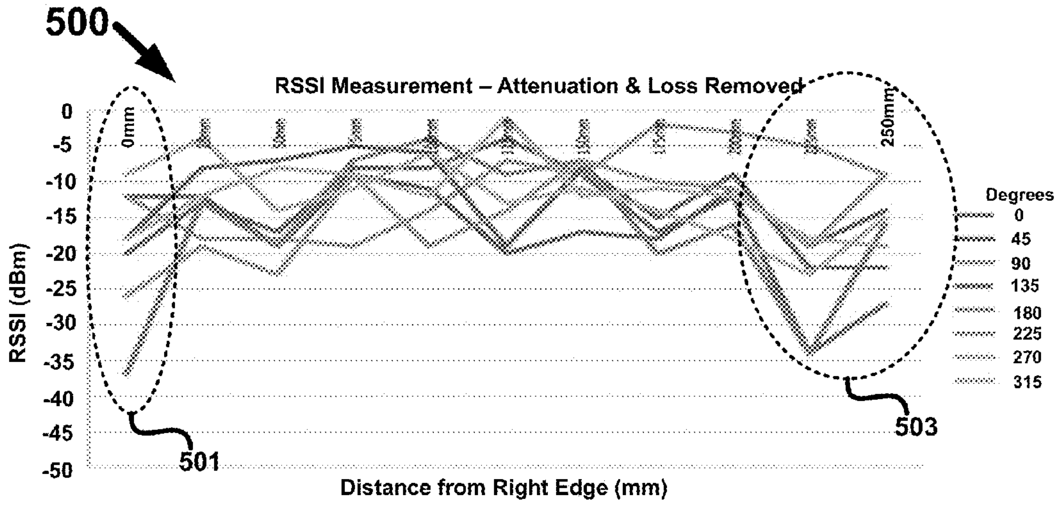
FIG. 5 (Prior Art)
FIG. 5 depicts a plot of RSSI measurements for a conventional system that uses an active antenna and does not use passive slits.

Attention is now directed to FIG. 5 which depicts a plot 500 of RSSI measurements for a conventional system that uses an active antenna and does not use passive slits. On a y-axis of plot 500, a received signal strength indication (RSSI) is measured in units of dBm and on an x-axis distance from a right edge of a substrate of electrically conductive material that only has a single aperture that defines a single active antenna. The substrate sans the passive slits RSSI loss below −20 dBm at the 0 mm position at the right most edge of the substrate as denoted by the region 501 in dashed line. Here, at 0 mm when the live device is rotated about its axis to the 180 degree and 225 degree positions, the RSSI is below −35 dBm at 180 degrees and is below −25 dBm at 180 degrees. Similarly, in region 502 between the 225 mm and 250 mm positions near the left end of the substrate, at the 225 mm position the 0 degree and 180 degree rotational positions result in RSSI that is almost at −35 dBm. At the 250 mm position, the 0 degree rotational position yields a RSSI that about below −27 dBm.

Figure 6:
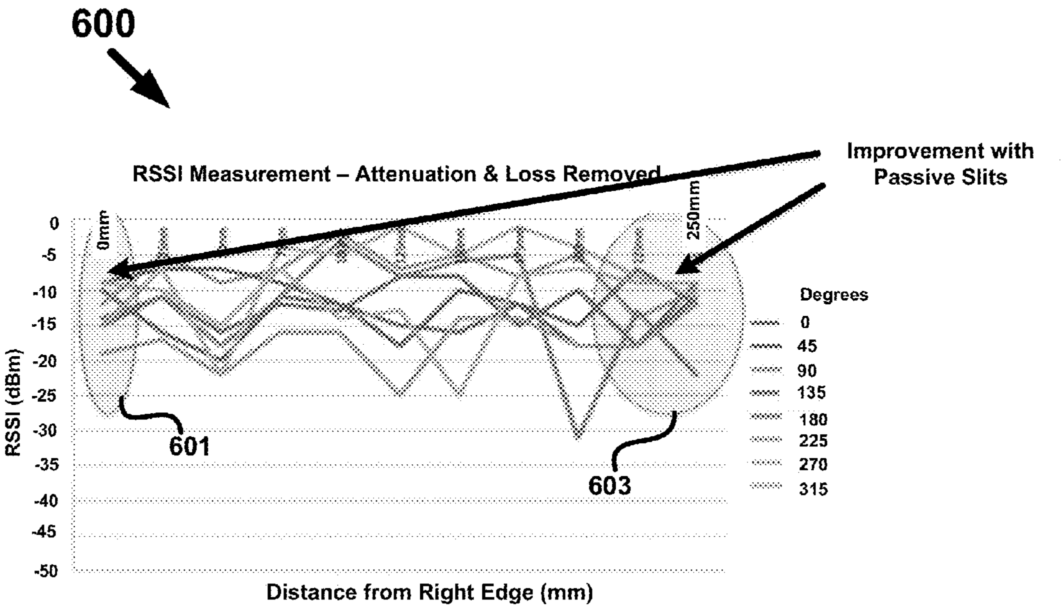
FIG. 6 depicts a plot of RSSI measurements for a system using an active antenna and passive slits, according to an embodiment of the present application.

Looking now at FIG. 6, an improvement in RSSI at the 0 mm, 225 mm and 250 mm positions on the substrate 150 that includes the active antenna 100 and the passive slits (101, 103), as depicted in FIGS. 4A-4B, is shown. In FIG. 6, in a region 601 at the 0 mm position at the rightmost end of the substrate 150, for all angular rotations between 0 degrees and 315 degrees, measured RSSI does not fall below −20 dBm for any angular position of the live device 450. The measured RSSI shows an improvement of approximately 17 db for the 180 degree position and approximately 6 dB for the 225 degree position when compared to the conventional no-passive slit configuration plotted in FIG. 5. In a region 503, at the 225 mm and 250 mm positions towards the leftmost end of the substrate 150, for all angular rotations between 0 degrees and 315 degrees, measured RSSI does not fall below −25 dBm for any angular position of the live device 450. At the 180 degree rotation at the 225 mm position, RSSI improved by approximately −20 dBm. At the 180 degree rotation at the 250 mm position, RSSI decreased by approximately 7 dB at just slightly below the 20 dBm line on the plot. At the 0 degree rotation at the 225 mm position, the RSSI improved by approximately 15 dB, and at the 250 mm position the RSSI improved by approximately 5 dBm.

The live device when placed directly on top of the substrate of FIG. 5 shows a larger positional dependency at the right and left ends of the substrate as highlighted in the regions 501 and 503. Therefore, a user who places his/her live device at the ends of the substrate may not have the RF signal emitted by the live device be detected by the substrate having only the active antenna. Accordingly, the user may have to consciously avoid certain portions and angular orientations of the live device on the substrate in order to get accurate detections of RF emissions from the live device.

Ideally, the most straight forward and easy to remember use scenario for a user may be a simple instruction to place the live device 450 anywhere on the surface 151 of the substrate 150 regardless of angular orientation of the live device, in order to have the RF emissions from the users device detected by the active antenna 100 used in conjunction with the passive slits (101, 103). The plot 600 of FIG. 6 and the depictions in FIGS. 4A-4B improve measured RSSI and allow for reduction or elimination of placement errors that may lead to low RSSI and failure to detect a live device 450 even thou it has been placed directly on the surface 151 of the substrate 150.

Figure 7:
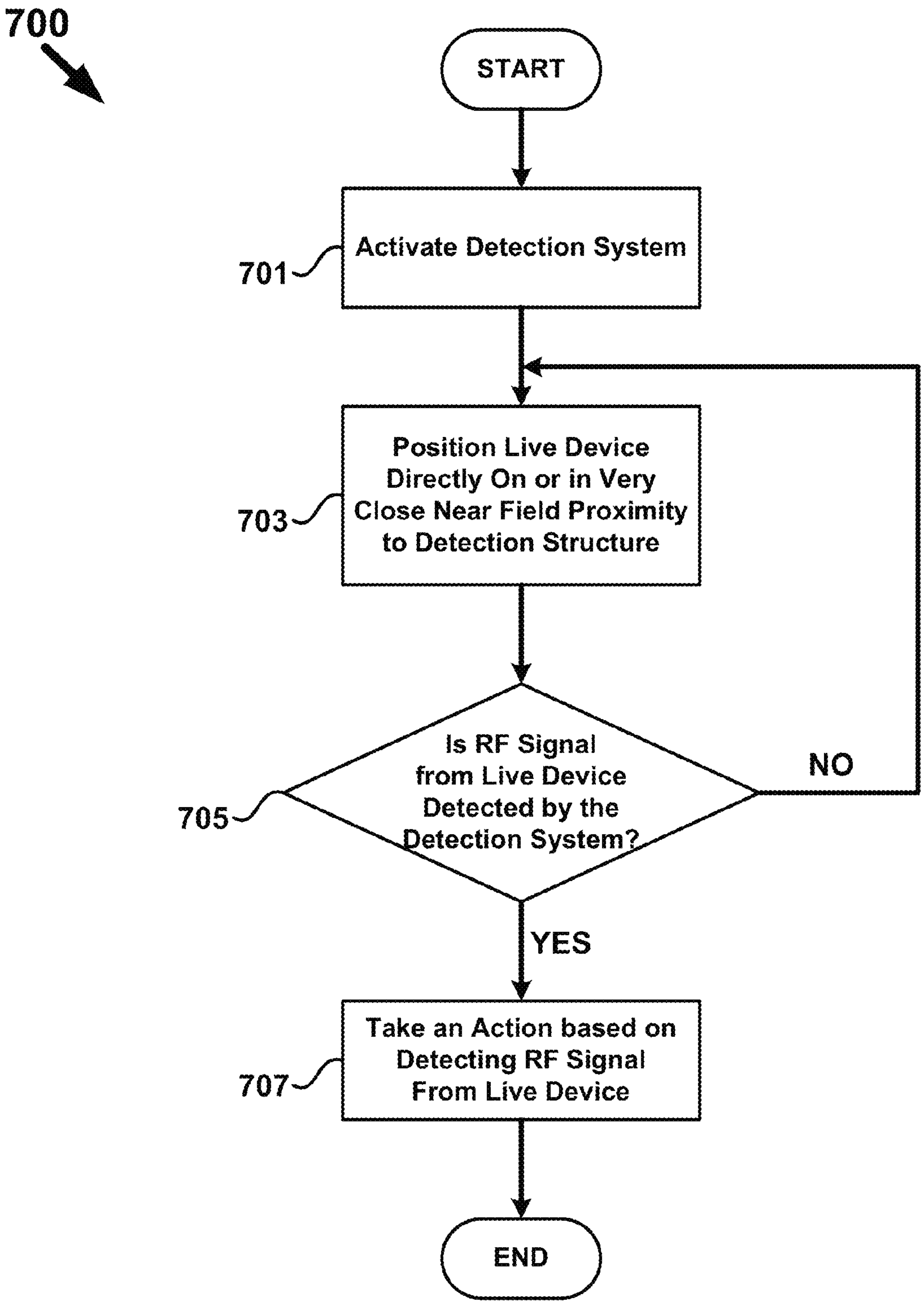
FIG. 7 depicts a flow diagram for detecting a live device using a system having an active antenna and passive slits, according to an embodiment of the present application.

FIG. 7 depicts a flow diagram 700 for detecting a live device (e.g., device 450) using a system having an active antenna 100 and one or more passive slits (101, 103). At a stage 701 a detection system is activated. The detection system may comprise the substrate 150 and its corresponding active antenna 100, passive slits (101, 103), and RF system 160. Activation may comprise powering up or signaling a system or portions of the system that includes the detection system. Activation places the system in readiness to detect RF signals from live devices placed on or in very close near field proximity of the substrate 150. At a stage 703 a live device is positioned directly on or in very close near field proximity to the detection system. At a stage 705 a determination may be made by the detection system or other system as to whether or not a RF signal from the live device has been detected by the detection system (e.g., RF system 160). If no RF signal is detected, then a NO branch may be taken back to a prior stage, such as the stage 703 to retry the process. If the RF signal is detected by the detection system, then a YES branch may be taken to a stage 707. At the stage 707 an action may be taken based on having detected the RF signal. The action that is taken will be application dependent. The action taken may be implemented using circuitry, hardware, software fixed in a non-transitory computer readable medium, or any combination thereof. As one example, the action taken may be to signal the RF system to activate a RF transceiver into a sniffing mode to begin sniffing packets from WiFi devices. WiFi devices having the strongest RSSI above a predetermined threshold (e.g., the live device 450 because it is right on top of the detection system) may be selected for further analysis, while others with WiFi devices below the threshold may be ignored. As another example, the action may comprise establishing wireless link with the live device and transferring content handling from the live device to a system or device that incorporates or uses the detection system. In some applications, the action taken may be to have the live device and a system/device that includes the RF system 160 and active antenna 100 to use the active antenna 100 to both Tx and Rx with the live device while the live device is still positioned directly on top of substrate or within near or very near field proximity, for example. Data that may be communicated during the Tx and Rx may include but is not limited to: wireless network names and passwords, user names and passwords necessary to access content the live device will hand over to the system/device for handling; locations (e.g., in data storage or the Cloud) for playlists and/or content, just to name a few. Active antenna 100 may be used to Tx at a very low power level so that other RF systems positioned beyond the near field region (e.g., >1 meter) may not be able to detect the transmissions from active antenna 100 due to low signal strength.

Figure 8:
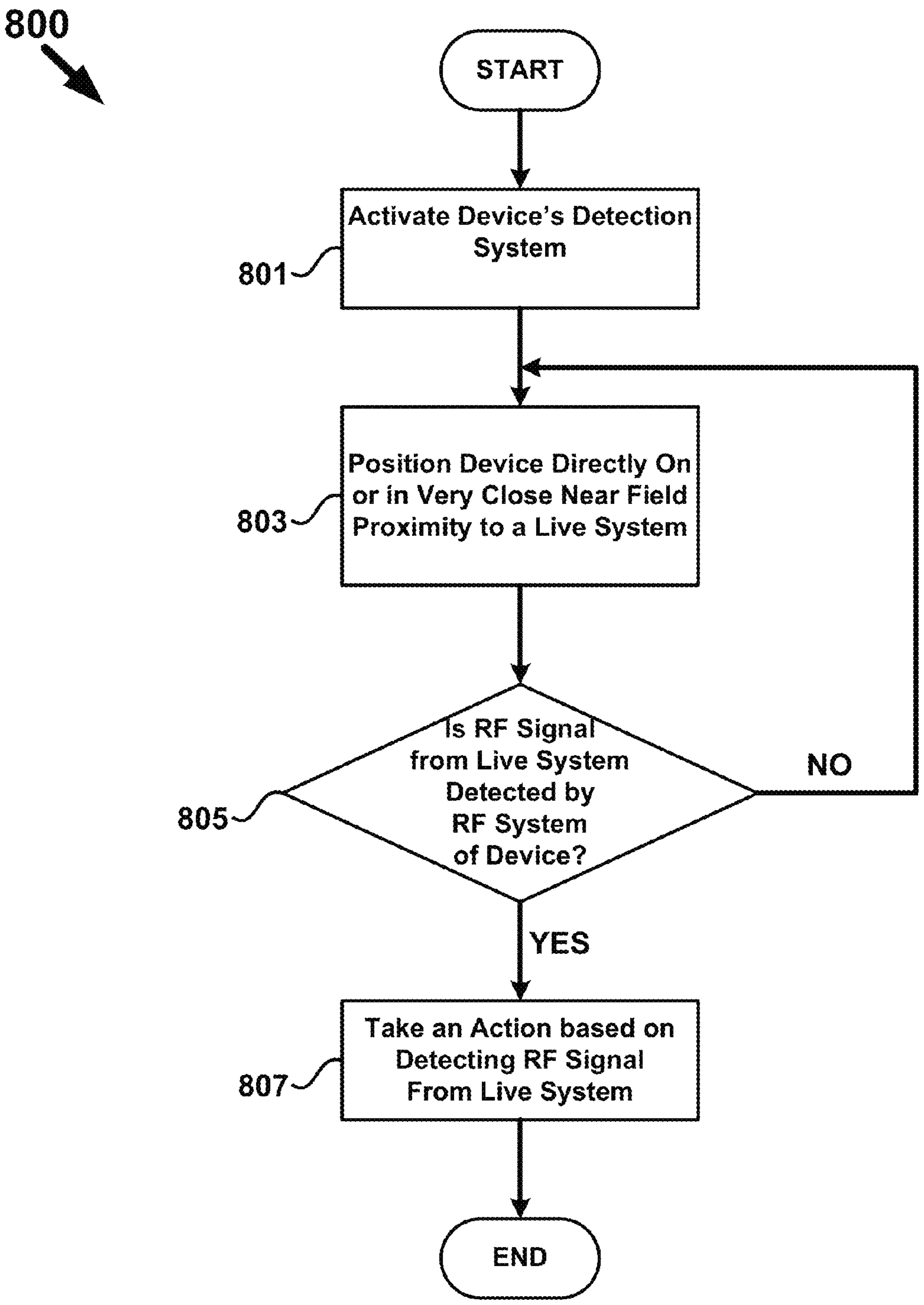
FIG. 8 depicts a flow diagram for detecting a live system using a device having an active antenna and passive slits, according to an embodiment of the present application.

FIG. 8 depicts a flow diagram 800 for detecting a live system using a device having an active antenna 100 and one or more passive slits (101, 103). At a stage 801 a device's detection system is activated. For example, the detection system may be includes in user device such as a smartphone, tablet, or pad, just to name a few. The user device may include the detection system having the substrate 150 and its corresponding active antenna 100, passive slits (101, 103), and RF system 160. At a stage 803 the device (e.g., a user device) is positioned directly on or in very close near field proximity of a live system. The live system may be any device, system or apparatus that generates, communicates, or networks using RF signals that may be detected and acted on by the device (e.g., a user device). At a stage 805, a determination may be made by the detection system or other system as to whether or not a RF signal from the live system has been detected by the detection system. If no RF signal is detected, then a NO branch may be taken back to a prior stage, such as the stage 803 to retry the process. If the RF signal is detected by the detection system, then a YES branch may be taken to a stage 807. At the stage 807 an action may be taken based on having detected the RF signal. The action that is taken will be application dependent. The action taken may be implemented using circuitry, hardware, software fixed in a non-transitory computer readable medium, or any combination thereof. As one example, the action taken may be to allow access to some structure or property such as an automobile, a garage, a door, a vault, a safe, an elevator, a turn style, an electronic device or system, a kiosk, just to name a few. The action taken may be similar to or identical to the actions described above for flow 700 of FIG. 7.

Figure 9A:
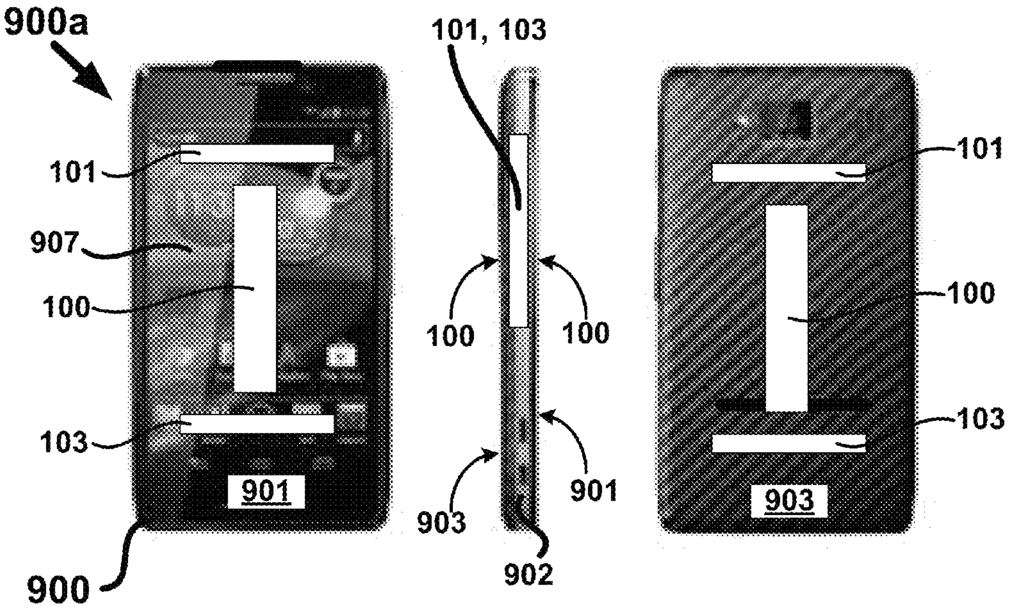
FIG. 9A depicts front, side, and back views of a device that includes an active antenna and passive slits, according to an embodiment of the present application.

FIG. 9A depicts front, side, and back views of a device 900 that includes an active antenna 100 and one or more passive slits (101, 103) and may be used for the device (e.g., user device) described above in flow 800 of FIG. 8. The active antenna 100 and one or more passive slits (101, 103) may be positioned on a front side 901 of device 900, a back side 903, a side 902, or some combination thereof. If the side 902 is not big enough to accommodate all of the elements of the detection system, such as both the active antenna 100 and the passive slits (101, 103), then at least some of those elements may be positioned on the side 902, such as the active antenna 100.

A display 907 on front side 901 of device 900 may be configured to include the active antenna 100 and one or more passive slits (101, 103) formed in an optically transparent and electrically conductive electrode material printed or otherwise formed on the display 907. Appropriate electrical connections between the opposed edges of the active antenna 100 may be made to the RF system and ground potential as described above. The back side 903 of the device 900 may be configured to include the active antenna 100 and one or more passive slits (101, 103) formed on an appropriate electrically conductive material for the substrate (e.g., substrate 150). Similarly, an appropriate material may be used to form active antenna 100, the passive slits (101, 103), or both on the sides 902 of device 900. In some examples, the active antenna 100 and one or more passive slits (101, 103) may be formed on multiple sides of the device 900, such as the front 901 and the back 903.

Figure 9B:
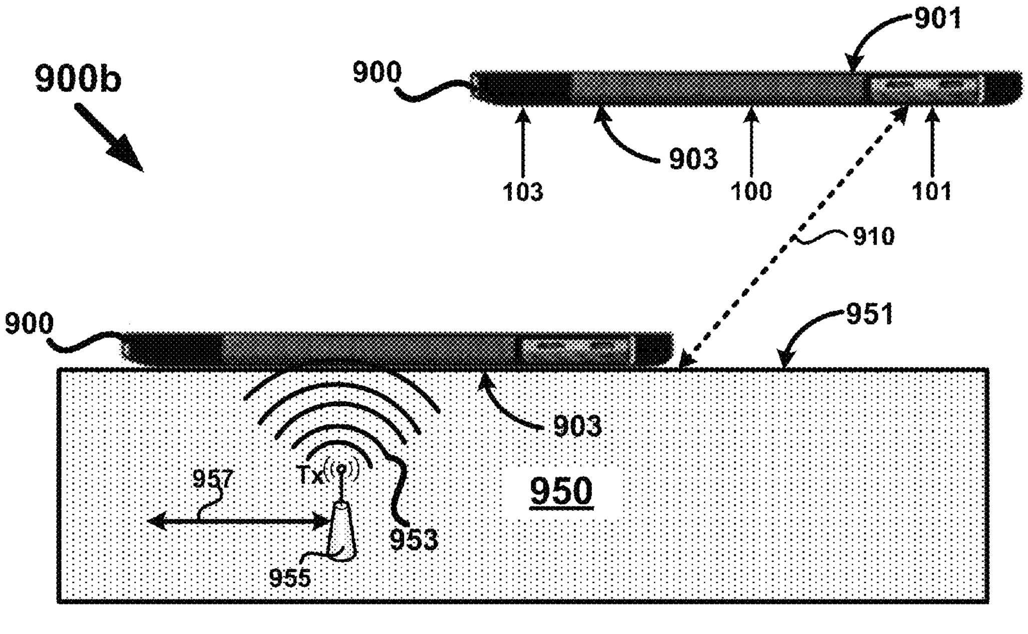
FIG. 9B depicts the device of FIG. 9A being positioned directly on top of a live system, according to an embodiment of the present application.

FIG. 9B depicts the device 900 of FIG. 9A being positioned 910 directly on top of a live system 950. Here, back side 903 of device 900 is positioned directly on a surface 951 of the live system 950 which is actively transmitting Tx and RF signal 953 from an antenna 955 that is electrically coupled 957 with a RF system (not shown) of the live system 950. When positioned directly on top of the live system 950, the active antenna 100, the passive slits (101, 103) on the back side 903 are positioned to detect the RF signal 953.

Figure 10A:
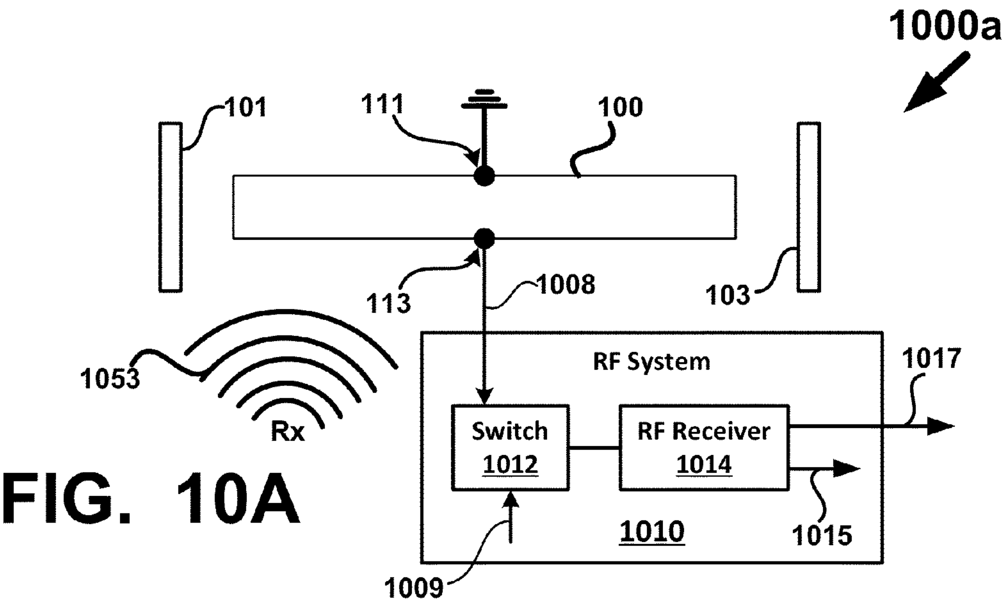
FIG. 10A depicts a schematic diagram of one example of an active antenna electrically coupled with a RF system, according to an embodiment of the present application.

FIG. 10A depicts a schematic diagram 1000*a* of one example of an active antenna 100 electrically coupled with a RF system 1010. RF system 1010 may optionally include a switch 1012 that in response to a signal 1009 may connect or disconnect the active antenna 100 from a RF receiver 1014. The RF system 1010 may not include the switch 1012, in which case, the active antenna 100 may be directly coupled with the RF receiver 1014. RF receiver 1014 may generate a signal 1015 internal to RF system 1010, a signal 1017 external to RF system 1010, or both in response to signals generate by RF signals Rx 1053 received by or incident on active antenna 100. A computer system such as that described above in reference to FIG. 2 may take some action based on one or more of the signals (1015, 1017). FIG. 10A depicts a receive only mode for the active antenna 100.

Figure 10B:
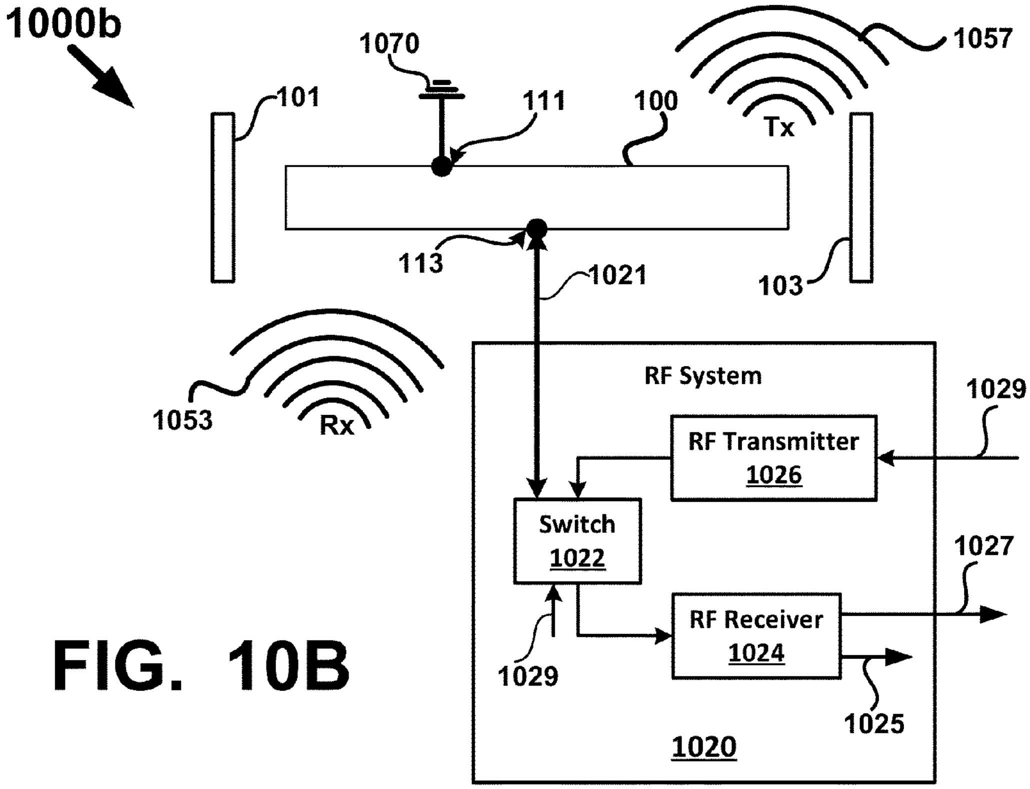
FIG. 10B depicts a schematic diagram of another example of an active antenna electrically coupled with a RF system, according to an embodiment of the present application.

FIG. 10B depicts a schematic diagram 1000*b* of another example of an active antenna 100 electrically coupled with a RF system 1020. Here, active antenna 100 is electrically couples with a switch 1022 that is responsive to one or more signals 1029 that activate the switch 1022 to couple the active antenna 100 with a RF receiver 1024 configured to detect signals caused by RF signals Rx 1053 received by or incident on active antenna 100, or to couple active antenna 100 with a RF transmitter 1026 configured to receive a signal 1029 and to cause the active antenna 100 to transmit RF signal Tx 1057 based on the signal 1029. RF receiver 1024 may generate a signal 1025 internal to RF system 1020, a signal 1027 external to RF system 1020, or both in response to signals generate by RF signals Rx 1053 received by or incident on active antenna 100. A computer system such as that described above in reference to FIG. 2 may take some action based on one or more of the signals (1025, 1025) and may generate the signal 1029 to be transmitted by active antenna 100.

Figure 11A:
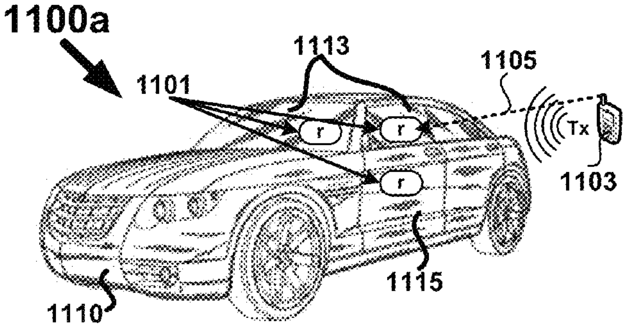
FIGS. 11A-11E depict different use examples for the active antenna/passive slit detection system, according to an embodiment of the present application.

FIGS. 11A-11E depict different use examples 1100*a*-1100*e* for the active antenna/passive slit detection systems described above. In FIGS. 11A-11E, actions may be taken by detection systems, live systems, live devices, or any combination of the aforementioned. In FIG. 11A a vehicle 1110 may include a detection system denoted as R positioned at various locations on the vehicle 1110. The detection system in R may comprise the active antenna 100, the passive slits (101, 103) and the RF system 160. A live device 1103 is transmitting Tx a RF signal and is positioned 1105 in direct or in very close near field proximity to detection system R, causing one or more actions to be taken, such as unlocking the vehicle, starting the vehicle, arming/disarming the alarm on the vehicle, causing content handling on live device 1104 to be transferred to a system of the vehicle, just to name a few. The detection system R may be disposed on a door, glass or plastic surface of the vehicle 1110 or some other structure, such as a windshield, a door, door glass, a dashboard, a door panel, a console, for example.

Figure 11D:
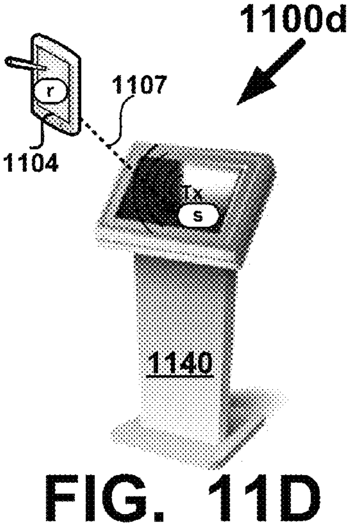
Figure 11B:
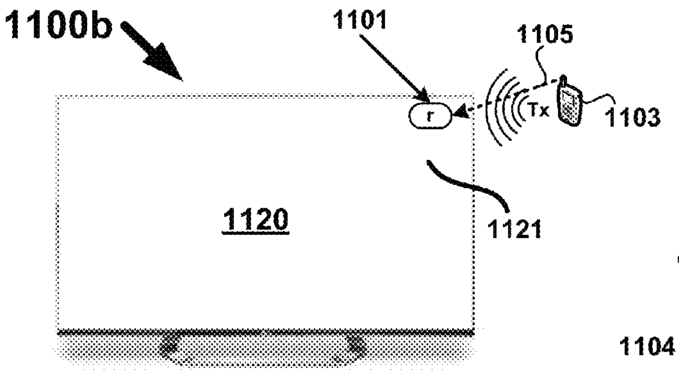

In FIG. 11B, the detection system R may be incorporated into a display 1121 of a smart TV 1120 and a live device 1103 when positioned 1105 in direct or in very close near field proximity to detection system R cause one or more actions to be taken by smart TV 1120 such as turning the smart TV 1120 on, allowing live device 1103 to control the smart TV 1120 (e.g., as a remote control), or causing the handling of content to be transferred from live device 1103 to the smart TV 1120, for example.

Figure 11E:
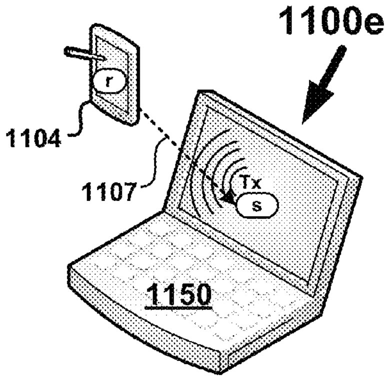
Figure 11C:
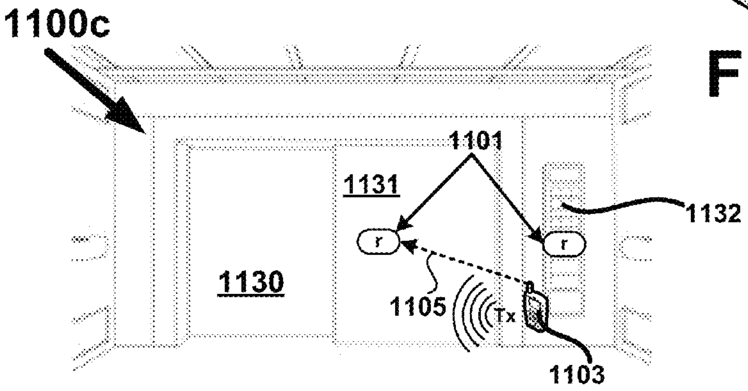

In FIG. 11C, the detection system R may be incorporated into a door 1131 or control panel 1132 of an elevator 1130 or similar conveyance. A live device 1103 when positioned 1105 in direct or in very close near field proximity to detection system R cause one or more actions to be taken by elevator 1130, such as allowing access to the elevator 1130, handshaking with the live device 1103 to determine which floor the elevator will transport a user to, transferring maintenance information/records from the elevator 1130 to the live device 1103, for example.

In FIG. 11D, a kiosk 1140 includes a live system S that transmits Tx a RF signal and device 1104 includes a detection system R that when positioned 1107 in direct or in very close near field proximity to live system S cause an action to be taken by the kiosk 1140, the device 1104, or both. For example, the action may be to cause the kiosk 1140 to print a ticket or boarding pass, to wirelessly transfer a ticket or boarding pass in digital form to the device 1104, download or transfer content/information from the kiosk 1140 to the device 1104, to allow access to a restricted area, transfer wireless network access information to the device 1104, just to name a few.

In FIG. 11E, a laptop 1150 includes a live system S that is transmitting Tx an RF signal. Device 1104 includes a detection system R that when positioned 1107 in direct or in very close near field proximity to live system S cause an action to be taken by the laptop 1150, the device 1104, or both. Here, the action taken my be to download images from the device 1104 to a storage system on the laptop 1150, to unlock or wake up the laptop 1150, cause the laptop to shut down or logoff for security purposes, cause the laptop 1150 to download content from the Internet based on a list stored in the device 1104, just to name a few. The examples depicted in FIGS. 11A-11E are non-limiting examples and the detection system R may be included in a variety of systems, devices, and structures such as a structure operative as a table, desk, counter, cabinet, window, a display screen, just to name a few.

The material for the substrate 150 may include any electrically conductive material including but not limited to metals, metal alloys, electrically conductive films, paints, and inks, PC boards, flexible PC boards, electrically conductive materials that can be printed on, painted on, screen printed on or otherwise formed or deposited on a substrate. The separate apertures for the active antenna 100 and passive slits (101, 103) may be formed by process including but not limited to etching, milling, cutting, sawing, drilling, punching, stamping, laser cutting, high pressure water cutting, just to name a few.

The systems, wireless media devices, apparatus and methods of the foregoing examples may be embodied and/or implemented at least in part as a machine configured to receive a non-transitory computer-readable medium storing computer-readable instructions. The instructions may be executed by computer-executable components preferably integrated with the application, server, network, website, web browser, hardware/firmware/software elements of a user computer or electronic device, or any suitable combination thereof. Other systems and methods of the embodiment may be embodied and/or implemented at least in part as a machine configured to receive a non-transitory computer-readable medium storing computer-readable instructions. The instructions are preferably executed by computer-executable components preferably integrated by computer-executable components preferably integrated with apparatuses and networks of the type described above. The non-transitory computer-readable medium may be stored on any suitable computer readable media such as RAMs, ROMs, Flash memory, EEPROMs, optical devices (CD, DVD or Blu-Ray), hard drives (HD), solid state drives (SSD), floppy drives, or any suitable device. The computer-executable component may preferably be a processor but any suitable dedicated hardware device may (alternatively or additionally) execute the instructions.

As a person skilled in the art will recognize from the previous detailed description and from the drawing FIGS. and claims set forth below, modifications and changes may be made to the embodiments of the present application without departing from the scope of this present application as defined in the following claims.

Although the foregoing examples have been described in some detail for purposes of clarity of understanding, the above-described inventive techniques are not limited to the details provided. There are many alternative ways of implementing the above-described techniques or the present application. The disclosed examples are illustrative and not restrictive.

What is claimed is:

1. A device, comprising:

a substrate of electrically conductive material including a plurality of separate apertures formed in the substrate, one or more of the plurality of separate apertures comprises an active antenna having length dimension that is substantially larger than a width dimension, an edge of the aperture along the length dimension is electrically coupled with a radio frequency (RF) receiver and an opposing edge of the aperture along the length dimension is electrically coupled with a ground potential;

the length dimension is selected to detune the active antenna at a frequency that is lower than a target frequency to be detected by the RF receiver, the length dimension being longer than a wavelength of the target frequency divided by two; and another of the one or more of the plurality of separate apertures comprises a passive slit that is not electrically coupled with the RF receiver or the ground potential, the RF receiver, the active antenna, and the passive slit being configured as a detection system, the detection system being configured to detect a signal having another frequency above the target frequency, the signal being generated by a device placed in close proximity to the detection system.

2. The device of claim 1, wherein the active antenna has a vertical polarization.

3. The device of claim 1, wherein a dielectric material is disposed in one or more of the plurality of separate apertures.

4. The device of claim 3, wherein the dielectric material comprises air.

5. The device of claim 1, wherein the passive slit has a length and a width that are less than the length dimension and width dimension, respectively of the active antenna.

6. The device of claim 1, wherein different dielectric materials are disposed in at least two of the plurality of separate apertures.

7. The device of claim 1, wherein the target frequency comprises a frequency or frequency range selected from the group consisting of 2.4 GHz, 2.4 GHz-2.48 GHz, from about 2.4 GHz to about 2.48 GHz, 5 GHz, military frequency bands, unlicensed frequency bands, cellular frequency bands, and licensed frequency bands.

8. The device of claim 1, wherein the target frequency is in a range from about 2.4 GHz to about 2.48 GHz and the active antenna is detuned to a range from about 0.5 MHz to about 1 GHz.

9. The device of claim 1, wherein the ground potential is a selected one of ground (GND) or a chassis ground.

10. The device of claim 1, wherein the substrate of electrically conductive material comprises at least a portion of a chassis or enclosure of an electrical device or system.

11. The device of claim 1 and further comprising:

a functional element, an esthetic element, or both, formed from an electrically non-conductive material and positioned in at least a portion of one or more the plurality of separate apertures.

12. The device of claim 1, wherein the substrate of electrically conductive material comprises a metal or a metal alloy.

13. The device of claim 1, wherein the substrate of electrically conductive material comprises a perforate material.

14. The device of claim 1 and further comprising at least two passive slits.

* * * * *